(12) United States Patent
Halley

(10) Patent No.: US 7,694,016 B2
(45) Date of Patent: Apr. 6, 2010

(54) COMPOSITE DNS ZONES

(75) Inventor: Robert Thomas Halley, Redwood City, CA (US)

(73) Assignee: Nominum, Inc., Redwood City, CA (US)

( * ) Notice: Subject to any disclaimer, the term of this patent is extended or adjusted under 35 U.S.C. 154(b) by 348 days.

(21) Appl. No.: 11/796,333

(22) Filed: Apr. 27, 2007

(65) Prior Publication Data

US 2008/0189437 A1    Aug. 7, 2008

Related U.S. Application Data

(60) Provisional application No. 60/888,728, filed on Feb. 7, 2007.

(51) Int. Cl.
*G06F 15/173* (2006.01)

(52) U.S. Cl. .................. 709/244; 709/203; 709/209; 709/219; 709/242; 709/245

(58) Field of Classification Search .......... 709/203, 709/209, 219, 242, 244, 245
See application file for complete search history.

(56) References Cited

U.S. PATENT DOCUMENTS

| | | | | |
|---|---|---|---|---|
| 6,314,469 B1 * | 11/2001 | Tan et al. | ................ | 709/245 |
| 6,374,295 B2 * | 4/2002 | Farrow et al. | ............ | 709/223 |
| 6,381,627 B1 * | 4/2002 | Kwan et al. | ............... | 709/201 |
| 6,769,031 B1 * | 7/2004 | Bero | ....................... | 709/245 |
| 6,785,704 B1 * | 8/2004 | McCanne | ............... | 718/105 |
| 6,834,302 B1 | 12/2004 | Harvell | | |
| 7,447,798 B2 * | 11/2008 | Klinker | .................. | 709/240 |
| 2001/0049741 A1 * | 12/2001 | Skene et al. | ............. | 709/232 |
| 2003/0009591 A1 | 1/2003 | Hayball et al. | | |
| 2003/0074461 A1 | 4/2003 | Kang et al. | | |
| 2003/0126199 A1 * | 7/2003 | Kadri et al. | ............. | 709/203 |
| 2004/0039798 A1 | 2/2004 | Hotz et al. | | |
| 2004/0148301 A1 | 7/2004 | McKay et al. | | |
| 2004/0210672 A1 * | 10/2004 | Pulleyn et al. | ........... | 709/245 |
| 2005/0015374 A1 | 1/2005 | Reinauer et al. | | |
| 2005/0114367 A1 | 5/2005 | Serebrennikov | | |
| 2005/0141485 A1 | 6/2005 | Miyajima et al. | | |
| 2006/0101026 A1 | 5/2006 | Fukushima | | |
| 2006/0112176 A1 * | 5/2006 | Liu et al. | ................ | 709/223 |
| 2006/0218301 A1 * | 9/2006 | O'Toole et al. | .......... | 709/244 |
| 2006/0248190 A1 | 11/2006 | Gardos et al. | | |
| 2006/0253609 A1 * | 11/2006 | Andreev et al. | .......... | 709/245 |
| 2007/0041393 A1 * | 2/2007 | Westhead et al. | ......... | 370/428 |

* cited by examiner

*Primary Examiner*—Michael Won
(74) *Attorney, Agent, or Firm*—Gard & Kaslow LLP

(57) ABSTRACT

A plurality of separate DNS zones are combined to form a composite DNS zone. The composite DNS zone is viewed as a single DNS zone by other elements on the network. Each of the separate DNS zones becomes a component DNS zone within the composite DNS zone but can still be separately owned and managed using standard DNS protocols. As such, the composite DNS zone provides a transparent method of combining DNS data owned by separate parties into a single location that can be searched using a DNS request of the prior art.

DNS requests directed to the composite DNS zone may result in a plurality of answer candidates. Some embodiments include algorithms for searching the composite DNS zone and assembling a DNS answer from the plurality of answer candidates. The composite DNS zone may include telephonic DNS data according to the ENUM standard.

32 Claims, 2 Drawing Sheets

COMPOSITE DNS ZONES

CROSS-REFERENCE TO RELATED APPLICATIONS

This application claims benefit of U.S. Provisional Patent Application No. 60/888,728 filed Feb. 7, 2007 and entitled "Composite DNS Zones." The disclosure of the above provisional application is hereby incorporated herein by reference.

BACKGROUND

1. Field of the Invention

The invention is in the field of communications and more specifically in the field of internet communication protocols.

2. Related Art

Internet communications depend on a Domain Name Service (DNS) through which domain names, such as www.nominum.com, are converted to numerical internet protocol (IP) addresses for use by switches, routers and other physical devices included in the internet. Typically, when a first device wishes to communicate with a second device represented by a domain name (or similar label), the first device sends out a DNS request to a local DNS server. The DNS request includes the domain name of the second device and a return IP address of the first device/requestor. The local DNS server may forward the request to an authoritative server that has an (IP) address corresponding to the requested domain name. In the prior art, each domain name request should return the IP addresses corresponding to the domain name. These IP addresses are found through the identification of an exact match or wildcard match for the domain name on a DNS server. A DNS server may be used for identifying other types of data including MX (Mail Exchange) records, PTR (Pointer) records for IP-to-name translation, NAPTR (Naming Authority Pointer) records for ENUM (Telephone Number Mapping), and the like.

The DNS namespace is hierarchical. For example, the domain name "nominum.e164.arpa." includes the root domain, ".", the global top level domain "arpa," a sub-domain "e164," and a sub-sub-domain "nominum." nominum.e164.arpa constitutes an example of a DNS zone. Each zone is operated under a DNS authority within the hierarchical structure of DNS. DNS zones are the unit under which DNS data is replicated to authoritative DNS servers. For example, in a "zone transfer" a DNS zone may be copied from a first authoritative server managed by an owner of the DNS zone to a second server. This second server may be managed by the zone owner, or may be managed by another party. Receipt of a mirror copy of the DNS zone by the second server establishes the second server as a second authoritative server. DNS protocols include a variety of procedures for maintaining the concurrency of these two copies of the DNS zone. Typically, a DNS zone is controlled and owned by a single entity, e.g., nominum.

Generally, a DNS zone includes a portion of the global DNS namespace under which responsibility has been delegated and not re-delegated. For example, the root domain "." is associated with a DNS zone that includes all of the global DNS namespace except for those parts of the global DNS namespace that have been re-delegated to a top level domain such as ".com". The domain ".com" domain is associated with a DNS zone that includes all of the DNS namespace delegated to ".com" except for those parts of the ".com" namespace that have been delegated to a sub-domain such as "nominum.com". The "nominum.com" domain in associated with the DNS zone delegated from ".com", except for any that may be further delegated by the authority that controls "nominum.com".

Internet protocols are now being used for a wide range of different applications. For example, telephone calls may now be connected and routed using the DNS system. These and other applications are placing increasing demands on the DNS system. There is, therefore, a need for expanding the capabilities of DNS while maintaining compatibility with current uses.

SUMMARY

Various embodiments of the invention include a composite DNS zone comprising multiple component DNS zones that may be controlled and owned by different entities. The composite DNS zone is configured to be viewed as a single DNS zone by other elements on a network. For example, the composite DNS zone may be addressed using a single (composite) namespace "telservices.e164.arpa" even though the composite DNS zone includes separately owned and controlled component DNS zones "telco1.e164.arpa," "telco3.com" and "telco2.e164.arpa." When a DNS request is made to telservices.e164.arpa, the requestor can operate as if a single legacy DNS zone was being queried, while, as further described herein, the request is actually applied to multiple independent DNS zones, e.g., telco1.e164.arpa, telco3.com and telco2.e164.arpa.

In some embodiments, a composite DNS zone includes more than one unique answer to a DNS request. As such, these embodiments may include one or more methods of selecting which answer to include in a response to the DNS request. For example, a composite DNS zone may include data relating to telephone numbers according to the ENUM DNS standard (RFC 3761), and a DNS request to the composite DNS zone may include a request for an NAPTR record associated with a telephone number. The component DNS zone telco1.e164.arpa may include a first NAPTR record for reaching the telephone number through Telco1's network, and the component DNS zone telco2.e164.arpa may include a second NAPTR record for reaching the telephone number through Telco2's network. The requested NAPTR record may also be used to associate a telephone number with a variety of different data types including, for example, a web page, an instant messenger account, a universal resource locator, a session initiation protocol, a universal resource identifier, and/or the like.

Various embodiments of the invention include a composite DNS server comprising a DNS protocol engine configured to receive a DNS request, configuration data memory configured to store configuration data characterizing a composite DNS zone including a first component DNS zone and a second component DNS zone, a composite zone manager configured to identify the first component DNS zone and the second component DNS zone using the configuration data, a query engine configured to apply a search algorithm to both the first component DNS zone and the second component DNS zone in response to the DNS request, the search algorithm configured to generate at least one answer candidate, an assembler configured to assemble a DNS answer using the at least one answer candidate, and a processor configured to execute the composite zone manager, query engine or assembler.

Various embodiments of the invention include a method of responding to a DNS request, the method comprising identifying a first component DNS zone and a second component DNS zone of a composite DNS zone, searching the first component DNS zone and the second component DNS zone for at least one answer candidate, and assembling a DNS answer using the at least one answer candidate.

Various embodiments of the invention include computer readable medium having stored thereupon computing instructions comprising, a code segment to identify a first component DNS zone and a second component DNS zone of a composite DNS zone using configuration data, a code segment to apply a search algorithm to the first component DNS zone and the second component DNS zone in response to a DNS request, and a code segment to assemble a DNS answer based on a result of the search algorithm.

DETAILED DESCRIPTION

In typical embodiments, an IP based network include at least one composite DNS server configured to use a composite DNS zone to respond to DNS requests. This composite DNS zone can be addressed using a single namespace, referred to herein as a "composite namespace," and comprises a plurality of component DNS zones. In some embodiments, the composite DNS zone is assembled in real-time in response to a DNS request. In other embodiments, the composite DNS zone is assembled prior to receiving a DNS request and is stored in an assembled manner in memory accessible to the composite DNS server. A DNS request addressed to the composite namespace is processed using the composite DNS zone.

Optionally, each component DNS zone is a separate DNS zone within the meaning of the DNS protocols. For example, the ownership and control of each component DNS zone can be independent. Further, each component DNS zone may be an authoritative copy of DNS data from a separate source, e.g., a slave copy that is transferred and maintained using the standard DNS AXFR and IXFR protocols. In some embodiments, the transfer and maintenance of a component DNS zone in a composite DNS zone is indistinguishable from transfers and maintenance of the prior art, from the point of view of the separate source. As such, the owners of the component DNS zones do not need to make changes in their systems in order to provide data that will be a component of a composite DNS zone.

In some embodiments, a composite DNS zone includes more than one unique answer to a DNS request. For example, two different component DNS zones may include different IP addresses associated with the same domain name or telephone number. As such, the composite DNS server is optionally configured to provide more than one result in a DNS answer and/or to select one result from a plurality of results. As is described further herein, there are a variety of possible approaches to picking a result for inclusion in a DNS answer.

Figure 1:
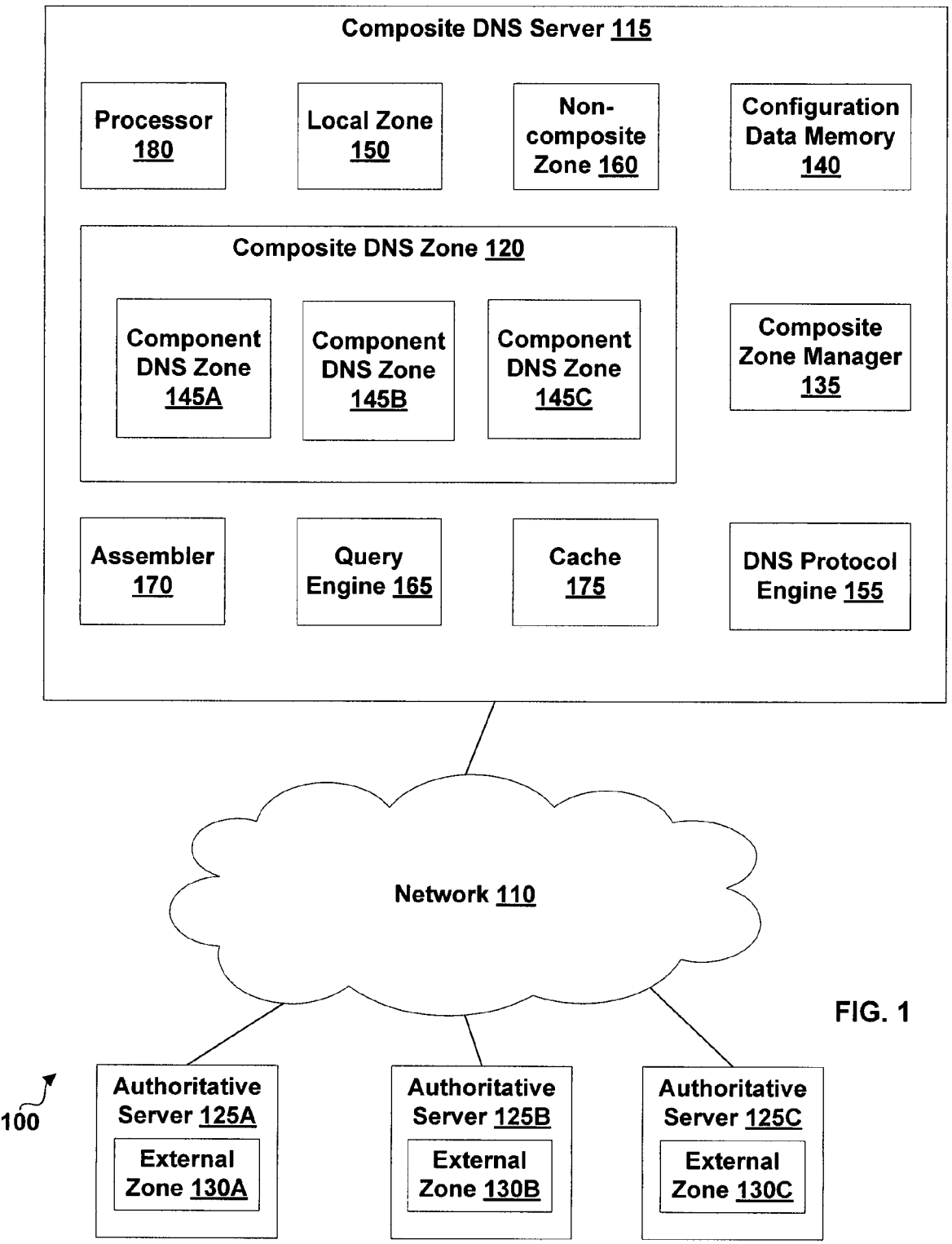
FIG. 1 illustrates various embodiments of a network including a composite DNS zone.

FIG. 1 illustrates various embodiments of a System 100 including a Network 110, and a Composite DNS Server 115 configured to make use of a Composite DNS Zone 120. In various embodiments, Network 110 includes a local area network, a wide area network, the internet, a telephone network, a wireless network, a communication network, and/or the like. Network 110 is optionally communicatively coupled to one or more Authoritative Servers 125A-125C each configured to store one or more DNS Zones 130A-130C.

Communication within System 100 is based, at least in part, on internet protocol standards using Domain Name Services (DNS). For example, a request for an IP address and/or other DNS data may be directed to an authoritative server, such as Authoritative Server 125A. This request is typically referred to as a "DNS request." The authoritative server may generate a "DNS answer" including the requested information and send the DNS answer to the sender of the DNS request. A DNS request is typically directed at a particular namespace. For example, a DNS request directed at telservices.com may include a request for an IP address associated with 800.telservices.com. Likewise, a DNS request directed at telservices.e164.arpa may include a request for an IP address or NAPTR record associated with a telephone number 1.650.381.6000. (e164.arpa is a namespace associated with the use of IP networks for telephonic communications according to the ENUM standard. The NAPTR record is a data record according to this standard.)

Composite DNS Server 115 typically includes a computing device having one or more processor configured to execute computing instructions, an input/output device, a display, volatile memory, non-volatile memory, a computing bus, and/or the like. Composite DNS Server 115 includes a Composite Zone Manager 135 configured to manage one or more composite DNS zone, such as Composite DNS Zone 120. Composite Zone Manager 135 includes computing instructions configured to be executed on a processor of Composite DNS Server 115 and to access composite DNS zone configuration data stored in a Configuration Data Memory 140. These computing instructions, and other computing instructions discussed herein, are optionally stored on a computer readable medium.

The composite DNS zone configuration data includes information regarding the one or more component DNS zones within each composite DNS zone. For example, in embodiments illustrated by FIG. 1, the composite DNS zone configuration data includes the identity of a Component DNS Zone 145A, a Component DNS Zone 145B and a Component DNS Zone 145C. Each of Component DNS Zones 145A-145C is a DNS zone and may be independently owned and/or controlled by different entities. For example, Component DNS Zone 145A may be owned by a first telephone company and operated under the namespace telco3.e164.arpa, while Component DNS Zone 145B may be owned by a second telephone company and operated under the namespace telco1.e164.arpa. Typically, even though Component DNS Zones 145A-145C are within the same composite DNS zone, they can be independently managed by their respective owners.

Each composite DNS zone and component DNS zone is referenced using a namespace. For example, Composite DNS Zone 120 may be referenced using telservices.e164.arpa, and Configuration Data Memory 140 may include a list "telco3.e164.arpa, telco1.e164.arpa and telco2.e164.arpa" referencing Component DNS Zones 145A-145C, respectively. This list is optionally ordered.

Component DNS Zones 145A-145C are typically obtained from a source external to Composite DNS Server 115. For example, in some embodiments, Component DNS Zones 145A-145C are authoritative copies of DNS Zones 130A-130C. Alternatively, one or more of Component DNS Zones 145A-145C may include a zone local to Composite DNS Server 115, such as a Local Zone 150. In some embodiments, Component DNS Zones 145A-145C are copies of DNS Zones 130A-130B. In these embodiments, Composite DNS Zone 120 includes memory configured to store these copies.

In alternative embodiments, one or more of Component DNS Zones 145A-145C is a virtual copy of the corresponding member of DNS Zones 130A-130C. In these embodiments, Composite DNS Zone 120 includes memory configured to store an IP address, universal resource locator, address, link, pointer, or the like to the data that is actually stored elsewhere. For example, Component DNS Zone 145C may include a link to DNS Zone 130C. To access DNS data within Component DNS Zone 145C a DNS request is sent to DNS Zone 130C.

A component DNS zone may be included in more than one composite DNS zone at the same time. For example, if Composite DNS Server 115 included two composite DNS zones, then Component DNS Zone 145C could be included in both of these composite DNS zones. Some operations, such as queries that do not modify the composite DNS zone, could be performed in parallel on the two different composite DNS zones, even though they both include the same Component DNS Zone.

A composite DNS zone may be included as part of another composite DNS zone. For example, Composite DNS Zone 120 may be included as an element within another composite DNS zone. As such, a composite DNS zone may include a hierarchy of nested composite DNS zones. A composite DNS zone may include both a component DNS zone and another composite DNS zone.

Composite Zone Manager 135 is optionally configured to maintain Component DNS Zones 145A-145C within Composite DNS Zone 120. This maintenance may be performed using DNS protocols. For example, Composite Zone Manager 135 may be configured to perform a zone transfer of DNS Zone 130A from Authoritative Server 125A to Composite DNS Zone 120 to establish Component DNS Zone 145A. Likewise, Composite Zone Manager 135 may be configured to facilitate incremental updates of Component DNS Zone 145A using DNS protocols. Composite Zone Manager 135 is further configured to facilitate accessing, e.g., querying, Composite DNS Zone 120, as is discussed elsewhere herein.

Composite DNS Server 115 further includes a DNS Protocol Engine 155 configured to receive messages via Network 110 using DNS and/or IP protocols. For example, DNS Protocol Engine 155 may be configured to receive a DNS request and to route the DNS request to a DNS zone. This DNS zone is typically the DNS zone that best matches a namespace of the destination address of the DNS request. This best matching DNS zone may be Composite DNS Zone 120, some other composite DNS zone, or a Non-composite Zone 160 (e.g., a DNS zone of the prior art). DNS Protocol Engine includes computing instructions configured to be executed on a processor of Composite DNS Server 115.

DNS Protocol Engine 155 is further configured to send a DNS reply via Networks 110 as further described elsewhere herein.

Composite DNS Server 115 further includes a Query Engine 165 configured for accessing and retrieving data from within Composite DNS Zone 120. Query Engine 165 includes computing instructions configured to be executed on a processor of Composite DNS Server 115 and to perform one or more alternative search algorithms on Composite DNS Zone 120. According to one search algorithm, each of Component DNS Zones 145A-145C is sequentially searched for a match to a query term. Once a first match is found, the search is terminated and the match is returned as the result of the search. According to another search algorithm, each of Component DNS Zones 145A-145C is searched and one match (if found) is returned from each of Component DNS Zones 145A-145C. This search algorithm may result in more than one match being returned, e.g., as many matches may be returned as there are component DNS zones. According to another search algorithm, each of Component DNS Zones 145A-145C is searched and more than one match may be returned from each of Component DNS Zones 145A-145C. This search algorithm may result in more matches being returned than there are component DNS zones. Further alternative search algorithms will be apparent to one of ordinary skill in the art.

In the search of each component DNS zone, match criteria are used to identify DNS data within the component DNS zone that matches a search term. A variety of alternative match criteria may be used by the search algorithms discussed herein. For example, either an exact match or a non-exact match could be required. Typically, an exact match requirement will result in at most one match per component DNS zone. However, an exact match requirement may result in two different results from two different component DNS zones. A non-exact match requirement may result in several matches being returned from each component DNS zone.

If the Component DNS Zones 145A-145C have a designated order within Composite DNS Zone 120, e.g., they are stored as an ordered list in Configuration Data Memory 140, the searches of Component DNS Zones 145A-145C may be made in a specific order. This order may be determinative of the results generated. For example, if the search algorithm includes searching each of the component DNS zones sequentially and returning the first result found, the order of component DNS zones may determine which result is found first.

Each match returned by Query Engine 165 is referred to herein as an "answer candidate." In embodiments wherein more than one answer candidate may result from a query, an optional Assembler 170 may be used to generate a DNS answer message using one or more of the answer candidates. In various embodiments, Assembler 170 includes computing instructions configured to be executed on a processor of Composite DNS Server 115 and to perform one or more assembly algorithms. According to one assembly algorithm, only the first answer candidate returned is included in the DNS answer. According to another assembly algorithm, all answer candidates are included in the DNS answer. According to another assembly algorithm, a predetermined number of answer candidates are included in the DNS answer.

According to some assembly algorithms, one or more "best" answer candidates are included in the DNS answer. A best answer is optionally determined using computing instructions within Assembler 170. In some embodiments, these computing instructions are configured to select a most complete match to a query as a best answer. For example, a query requesting a NAPTR record for the telephone number +44.118.958.7366 may result in one answer candidate that includes the country code "44" and city code "118," while a second answer candidate includes the country code "44," the city code "118" and a local exchange "958." The answer candidate including the local exchange may be considered the better result in some embodiments.

In various embodiments, a best answer is determined based on one or more preferred characteristic of the answer candidates. In some embodiments, these preferred characteristics include a cost parameter. For example, an answer candidate that includes an IP address of a telephone exchange that charges a lower fee may be preferred over an answer candidate that includes an IP address or NAPTR record associated with a telephone exchange that charges a higher fee. In some embodiments, these preferred characteristics include an identity of the member of Component DNS Zones 145A-145C in which the answer candidate was found. For example, if the sender of the DNS request has an agreement to favor network services offered by telco1 at telco1.e164.arpa, then an answer result from Component DNS Zone 145B (associated with telco1.e164.arpa) may be preferred over answer candidates from other component DNS zones. In some embodiments, these preferred characteristics include a quality of service parameter. For example, an answer candidate including an IP address to a network having a higher available bandwidth or reliability may be preferred over a network having a lower available bandwidth or reliability.

Typically, preferred characteristics are included within each of Component DNS Zones 145A-145C and, thus, can be returned to Assembler 170 as part of a query result. However, in some embodiments, a preferred characteristic may be derived from information stored in Configuration Data Memory 140 and/or from a source external to Composite DNS Server 115. For example, Assembler 170 optionally includes computing instructions configured to retrieve cost data from an external source or to test a quality of service in real-time.

In various embodiments, a best answer is determined using computing instructions external to Composite DNS Server 115. These computing instructions may be controlled by the owner of Composite DNS Server 115 or another party and may be configured for making decisions based on goals such as minimizing cost, providing better service, fulfilling a contract, serving a customer, and/or the like.

In various embodiments, Composite DNS Server 115 is configured for performing one, several or all of the search algorithms and assembly algorithms discussed herein. In embodiments including more than one search algorithm, Composite Zone Manager 135 is optionally configured to select the proper algorithm. For example, Zone Manager 135 may include computing instructions configured to select algorithms based on the source of a DNS request, based on an agreement between parties, based on data within a DNS request, based on a namespace to which the DNS request was directed, and/or the like.

Search and/or assembly algorithms may be selected based on the source of a DNS request by examining the replay address included in the DNS request. Composite Zone Manager 135 may be configured to, for example, use a particular set of algorithms for DNS requests received from IP an address associated with a particular client.

An agreement between parties may be used to select algorithms in a variety of ways. For example, the owners of Component DNS Zones 145A-145C may agree that the selection of the best answer should rotate among alternative algorithms such that each has an equal change of providing the answer. Or, the owners may agree that the selection of the best answer should go to an owner willing to pay for the privilege. In one embodiment, owners, or other parties, may offer bids in an auction format for the privilege of being able to designate the algorithm used to select the best answer.

Algorithms may be selected based on algorithm selection data placed within a DNS request. For example, a sender of the request may specifically include a token configured to be interpreted by Composite Zone Manager 135 for the purposes of selecting algorithms. In these embodiments, a sender of a DNS request may be able to determine the type of response they receive. For example, Composite Zone Manager 135 may be configured to parse DNS requests for an algorithm selection token. This token may take the values "first" for the first answer candidates, "all" for all answer candidates, "top5" for the five best answers, "cost" for an algorithm considering cost, "service" for an algorithm considering service, and/or the like.

Algorithms may be selected based on a namespace to which the DNS request was directed by associating specific algorithms with specific namespaces. For example, two different instances of Composite DNS Zone 120 may be associated with different namespaces and algorithms, as specified in Configuration Data Memory 140. In another example, Composite DNS Zone 120 may be associated with the namespace telservices.e164.arpa and a DNS request directed to a sub-domain "all.telservices.e164.arpa" may be processed using an algorithm that returns all candidate answers. Likewise, DNS requests directed at sub-domains "bestcost.telservices.e164.arpa," "top5.telservices.e164.arpa," "first.telservices.e164.arpa," may be processed using different algorithms.

The DNS request used to select search and/or assembly algorithms may include the querying client's IP addresses, the namespace to which the DNS request is directed, a token embedded in the request, and/or the like.

Assembler 170 is optionally further configured to reorigin the DNS answer. Reorigining includes changing names in the DNS answer to represent Composite DNS Zone 120 rather than one of the Component DNS Zones 145A-145C. For example, if the DNS answer includes an answer candidate from Component DNS Zone 145B under the namespace telco1.e164.arpa, this answer candidate may include domain names which are subdomains of telco1.e164.arpa. Reorigining this DNS answer means replacing the "telco1.e164.arpa." suffix with the composite zone's origin, "telservices.e164.arpa.". E.g. "800.telco1.e164.arpa." would be reorigined to "800.telservices.e164.arpa.".

Composite DNS Server 115 optionally further includes a Cache 175 configured for caching DNS answers that have been prepared using Composite DNS Zone 120. These cached DNS answers may include multiple answer candidates and may be stored in association with the identities of search and/or assembly algorithms used to generate each DNS answer. For example, a cached DNS answer may be stored in a data record that also includes data identifying the assembly algorithm. DNS answers cached in Cache 175 may be used to reply to later DNS requests without having to query Composite DNS Zone 120. For example, if an appropriate DNS answer is stored in Cache 175, then this DNS answer can be sent in response to a matching DNS request without accessing Composite DNS Zone 120.

Composite DNS Server 115 further includes a Processor 180 configured for executing logic, e.g., computing instructions included in Composite Zone Manager 135, DNS Protocol Engine 155, Query Engine 165, and/or Assembler 170. Processor 180 may, thus, be configured to perform the operations of Composite Zone Manager 135, DNS Protocol Engine 155, Query Engine 165, and/or Assembler 170. Processor 180 may be configured to communicate with Configuration Data Memory 140 via a data bus (not shown). Processor 180 may be distributed among several different circuits. For example, Processor 180 may include central processing units disposed in a plurality of computing devices.

Elements of Composite DNS Server 115 are optionally distributed among a plurality of computing devices.

Figure 2:
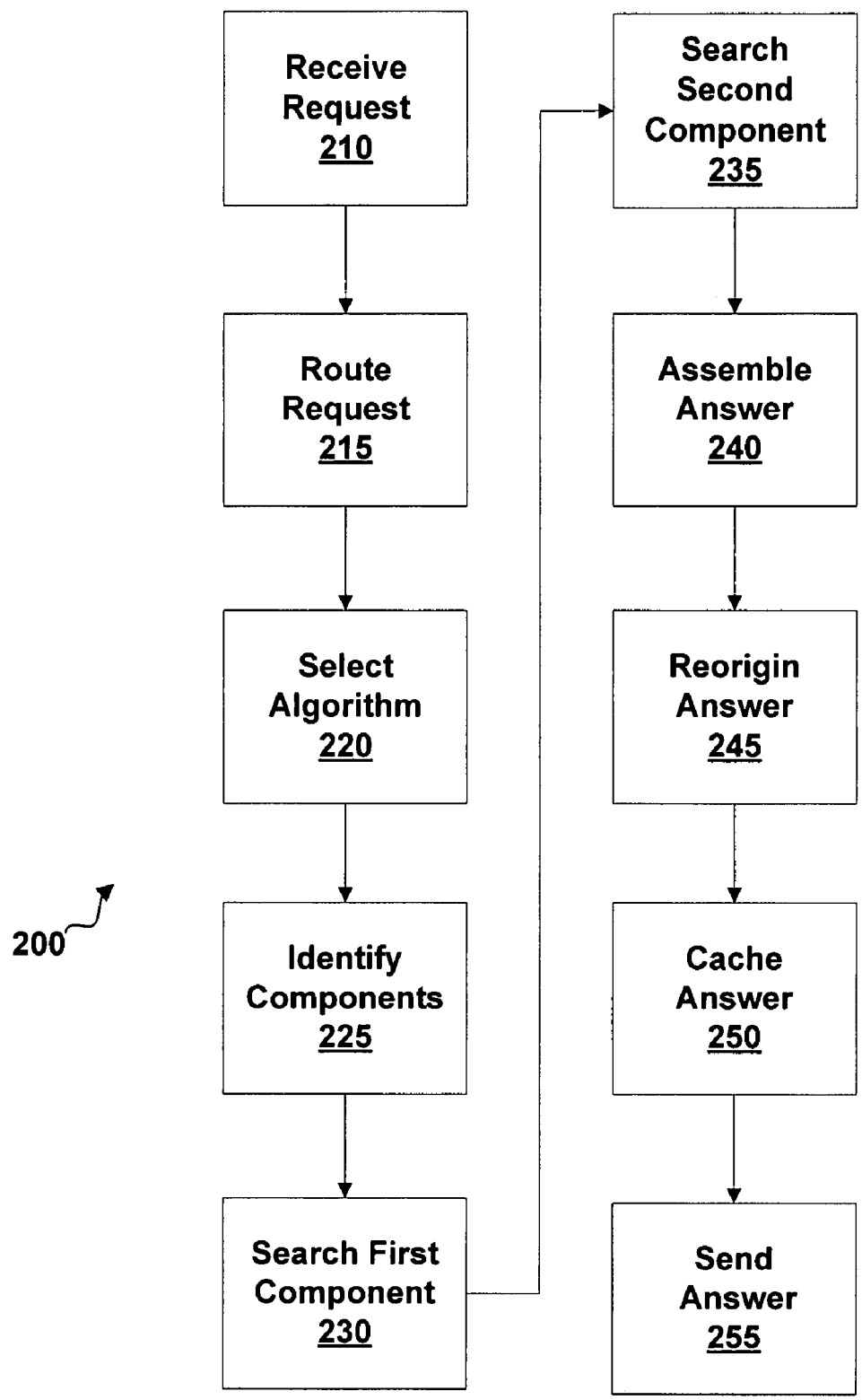
FIG. 2 illustrates a method of processing a DNS request according to various embodiments.

FIG. 2 illustrates a method, generally designated 200, of processing a DNS request according to various embodiments. In this method, the DNS request is received and applied to a composite DNS zone. Candidate answers returned from the composite DNS zone are optionally assembled into a reorigined DNS answer and this answer is sent to the source of the DNS request.

In a Receive Request Step 210, a DNS request is received by Composite DNS Server 115 from a requester over Network 110. This DNS request may include, for example, a request for an IP address associated with a domain name and/or other label.

In a Route Request Step 215, the received DNS request is routed by DNS Protocol Engine 115 to an appropriate DNS zone within Composite DNS Server 115. For example, if the DNS request is directed to Non-composite Zone 160, then DNS Protocol Engine 155 may direct the request to computing instructions configured for processing the DNS request for processing using this DNS zone. Likewise, if the DNS request is directed to Composite DNS Zone 120, then Route Request Step 210 may include directing the DNS request to computing instructions configured for processing the DNS request using this DNS zone. Route Request Step 215 is optional in embodiments wherein Composite DNS Server 115 includes only a single DNS zone. If the DNS request is directed toward a non-composite zone, then those steps discussed below that are specific to composite DNS zones may be omitted.

In a Select Algorithm Step 220, Composite Zone Manager 135 is used to select algorithms for querying Composite DNS Zone 120 and/or for assembling a DNS answer. As described elsewhere herein, algorithm selection may be based on a variety of factors, such as the source of the request, a token within the request, a target namespace of the request, and/or the like. Select Algorithm Step 220 is optional in embodiments wherein Composite DNS Server 115 is configured to process DNS requests using only a single set of algorithms.

In an Identify Components Step 225, Composite Zone Manager 135 is used to identify the components of Composite DNS Zone 120 using the configuration data stored in Configuration Data Memory 140. In some embodiments, Identify Components Step 225 includes assembling Composite DNS Zone 120 in real-time. For example, data within Configuration Data Memory 140 may indicate that Composite DNS Zone 120 includes Component DNS Zones 145A-145C under the namespaces telco3.e164.arpa, telco1.e164.arpa and telco2.e164.arpa, respectively. As such, Composite Zone Manager 135 will assemble Composite DNS Zone 120 from these components in real-time. This assembly need not include moving of data between memory locations because, in typical embodiments, the data from each component DNS zone is not merged together but rather kept separate.

In a Search First Component Step 230, a first component DNS zone within Composite DNS Zone 120, e.g., Component DNS Zone 145A, is searched. This search is typically performed in accordance with a search algorithm selected in Select Algorithm Step 220. In a Search Second Component Step 235, a second component DNS zone within Composite DNS Zone 120, e.g., Component DNS Zone 145B, is searched in accordance with the search algorithm. The Method 200 illustrated in FIG. 2 optionally includes searching further component DNS zones within Composite Zone 120, e.g., Component DNS Zone 145C.

Search First Component Step 230 and Search Second Component Step 235 are typically performed using Query Engine 165 and may result in one or more candidate answers depending on the search algorithm used.

In an Assemble Answer Step 240, candidate answers are assembled into a DNS answer using Assembler 170 according to an assembly algorithm. This assembly algorithm is optionally an assembly algorithm selected in Select Algorithm Step 220. Assemble Answer Step 240 results in a DNS answer that may include more that one candidate answer. These candidate answers may be from different members of Component DNS Zones 145A-145C.

In an optional Reorigin Answer Step 245, the DNS answer generated in Assemble Answer Step 240 is reorigined using Assembler 170, using the reorigining process described elsewhere herein. Reorigin Answer Step 245 is optional when the DNS answer generated in Assemble Answer Step 170 already includes information identifying the expected source of the DNS answer. This source information may be provided in Assemble Answer Step 240 or may be associated with the first and second candidate answers prior to Assemble Answer Step 240 or Receive Request Step 210. For example, Reorigin Answer Step 245 may be optional if either all of the domain names in the candidate answers are already subdomains of the composite zone; or the DNS client to whom the DNS answer is addressed is willing to accept answers from domains other than the one it queried.

In some embodiments, Reorigin Answer Step 245 includes changing the DNS answer to correspond to match criteria included in the DNS request received in Receive Request Step 210. This process is referred to as "match renaming." For example, assuming a composite DNS zone "telservices.e164.arpa" comprising composite zones "e164.telco1.com" and "e164.telco2.com," then a search for a NAPTR record associated with "4.3.2.1.telservices.e164.arpa" may return "3.2.1.e164.telco1.com" and "1.e164.telco2.com." In match renaming, these two results can both be renamed to "4.3.2.1.telservices.e164.arpa." The match renaming matches the results to the original match criteria received in a DNS request.

In an optional Cache Answer Step 250, the reorigined DNS answer is cached in Cache 175. This cached copy of the DNS answer may be used if the DNS request is received again.

In a Send Answer Step 255, the reorigined DNS answer is sent to the requester via Network 110. In some embodiments, the reorigined DNS answer is configured such that the requestor cannot tell if it was based on a composite DNS zone or a non-composite DNS zone. As such, the use of composite DNS zones may be transparent to other elements of System 100.

In alternative embodiments, the steps of Method 200 as illustrated in FIG. 2 are performed in different orders. For example, Select Algorithm Step 220 may be performed following Identify Components Step 225.

Several embodiments are specifically illustrated and/or described herein. However, it will be appreciated that modifications and variations are covered by the above teachings and within the scope of the appended claims without departing from the spirit and intended scope thereof. For example, while the examples discussed herein include the processing of DNS requests and generation of DNS answers, Composite DNS Server 115 and Composite DNS Zone 120 may be used to provide other DNS services related to a variety of applications, e.g., call routing applications, DNS search list fusion applications, or the like. The computing instructions discussed herein may include software and/or firmware. In some embodiments, computing instructions may be replaced by hardware configured to perform equivalent operations.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A composite DNS server comprising:
   a DNS protocol engine configured to receive a DNS request;
   configuration data memory configured to store configuration data characterizing a composite DNS zone including a first component DNS zone and a second component DNS zone;
   a composite zone manager configured to identify the first component DNS zone and the second component DNS zone using the configuration data, the composite zone manager further configured to select a search algorithm from among a plurality of alternative search algorithms;
   a query engine configured to apply the selected search algorithm to both the first component DNS zone and the second component DNS zone in response to the DNS request, the selected search algorithm configured to generate at least one answer candidate;
   an assembler configured to assemble a DNS answer using the at least one answer candidate; and
   a processor configured to execute the composite zone manager, query engine or assembler.

2. The composite DNS server of claim 1, wherein the configuration data includes an ordered list of component DNS zones.

3. The composite DNS server of claim 1, wherein the composite zone manager is configured to select the search algorithm based on information included within the DNS request.

4. The composite DNS server of claim 1, wherein the search algorithm is configured to return the first answer candidate found and then terminate the search.

5. The composite DNS server of claim 1, wherein the search algorithm is configured to return a plurality of answer candidates.

6. The composite DNS server of claim 1, wherein the search algorithm is configured to return a first answer candidate from the first component DNS zone and a second answer candidate from the second component DNS zone.

7. The composite DNS server of claim 1, wherein the search algorithm is configured to return the at least one answer candidate based on a partial match.

8. The composite DNS server of claim 1, wherein the assembler is configured to identify a best answer from a plurality of answer candidates including the at least one answer candidate.

9. The composite DNS server of claim 1, wherein the assembler is configured to identify a best answer from a plurality of answer candidates including the at least one answer candidate, the best answer being identified based on a quality of service or a cost of service.

10. The composite DNS server of claim 1, wherein the composite DNS zone is included in another composite DNS zone.

11. The composite DNS server of claim 1, wherein the first component DNS zone is a virtual copy of a DNS zone.

12. The composite DNS server of claim 1, further including memory configured to store the first component DNS zone in the composite DNS server.

13. The composite DNS server of claim 1, wherein the assembler is further configured to reorigin the DNS answer to a namespace of the composite DNS zone.

14. A method of responding to a DNS request, the method comprising:
   identifying a first component DNS zone and a second component DNS zone of a composite DNS zone;
   selecting a search algorithm from a plurality of search algorithms for searching the first component DNS zone and the second component DNS zone;
   searching the first component DNS zone and the second component DNS zone for at least one answer candidate, the search using the selected search algorithm; and
   assembling a DNS answer using the at least one answer candidate.

15. The method of claim 14, wherein the first component DNS zone and the second component DNS zone are each owned by a separate entity.

16. The method of claim 14, wherein the first component DNS zone and the second component DNS zone are associated with different namespaces.

17. The method of claim 14, wherein the first component DNS zone and the second component DNS zone are both authoritative copies of different DNS zones.

18. The method of claim 14, wherein assembling the DNS answer includes selecting a best answer candidate.

19. The method of claim 14, wherein searching the first component DNS zone and the second component DNS zone results in more than one answer candidate.

20. The method of claim 14, further including reorigining the DNS answer to a namespace of the composite DNS zone.

21. The method of claim 14, wherein selecting the search algorithm from the plurality of search algorithms for searching the first component DNS zone and the second component DNS zone, is responsive to information included in the DNS request.

22. The method of claim 14, further including assembling the DNS answer in response to receiving the DNS request.

23. A method of responding to a DNS request, the method comprising:
   identifying a first component DNS zone and a second component DNS zone of a composite DNS zone;
   searching the first component DNS zone and the second component DNS zone for at least one answer candidate;
   selecting an assembly algorithm from a plurality of assembly algorithms for assembling a DNS answer; and
   assembling the DNS answer using the at least one answer candidate and the selected assembly algorithm.

24. The method of claim 23, wherein the first component DNS zone and the second component DNS zone are each owned by a separate entity.

25. The method of claim 23, wherein the first component DNS zone and the second component DNS zone are associated with different namespaces.

26. The method of claim 23, wherein the first component DNS zone and the second component DNS zone are both authoritative copies of different DNS zones.

27. The method of claim 23, wherein assembling the DNS answer includes selecting a best answer candidate.

28. The method of claim 23, wherein searching the first component DNS zone and the second component DNS zone results in more than one answer candidate.

29. The method of claim 23, further including reorigining the DNS answer to a namespace of the composite DNS zone.

30. The method of claim 23, further including selecting a search algorithm from a plurality of search algorithms for searching the first component DNS zone and the second component DNS zone.

31. The method of claim 23, wherein selecting the assembly algorithm from the plurality of assembly algorithms for assembling the DNS answer is responsive to information included in the DNS request.

32. The method of claim 23, further including assembling the DNS answer in response to receiving the DNS request.

* * * * *